3,170,900
PROCESS OF POLYMERIZING LOWER OLEFINS
Shinjiro Kodama, Kenichi Fukui, Sachio Yuasa, Takeo Shimizu, and Tsutomu Kagiya, Kyoto, Sueo Machi, Osaka, Minoru Hirata, Niihama-shi, and Tetsuya Yagi, Itami-shi, Japan, assignors to Sumitomo Chemical Company, Ltd., Osaka, Japan, a corporation of Japan
No Drawing. Filed Nov. 20, 1962, Ser. No. 239,092
Claims priority, application Japan, Sept. 9, 1957, 32/22,342; Dec. 18, 1957, 32/31,530, 32/31,531; Dec. 21, 1957, 32/32,038; Dec. 23, 1957, 32/32,131
7 Claims. (Cl. 260—88.2)

This invention relates to a process for the polymerization of lower olefins by use of a catalyst composition in which both a metal halide and a metal co-exist in free state and said metal consists at least part of agitating means.

This application is a continuation-in-part of copending application Serial No. 759,404, now abandoned filed by Shinjiro Kodama, Kenichi Fuki, Sachio Yuasa, Takeo Shimizu, Tsutomu Kagiya, Sueo Machi, Minoru Hirata, and Tetsuya Yagi.

According to the present invention, the polymerization of lower olefins is carried out by bringing a lower olefin into contact with a catalyst which is a mixture of a metal halide and the specific metal, at a temperature below 200° C. In this case, as further explained hereinafter, it is a characteristic of the present invention that the metal halide is that which has the greatest possible number of halogen atoms in the molecule, and that it is kept in such a condition that said metal halide is not so entirely exhausted as to react with the coexistent metal. The term "co-existence in the free state" refers to this condition. Furthermore, it is another characteristic that said metal consists at least part of agitating means.

A process according to the present invention can produce a high molecular polymer by use of an easily obtainable catalytic composition, without employing an organic metal compound, the preparation and treating of which are technically difficult. In this regard, the present process is extremely superior to conventional processes of olefin polymerization.

The solid polyethylene produced by the ethylene polymerization according to the present invention has a melting point of 120 to 200° C., a molecular weight of 5,000 to 400,000, tensile strength of 100 to 250 kg./cm.$^2$ and a specific gravity of 0.940 to 0.950, and these physical properties can be suitably varied in the above range, depending upon the reaction conditions. Infrared absorption spectrum analysis shows that methyl groups and double bonds are present in less than 1 and 0.1 per 1,000 carbon atoms respectively and that the crystallinity is considerably higher than that of polyethylene of a high pressure process.

Further, in the ethylene polymerization of the present invention in which an aluminum-made agitator (made of 99.98% purity aluminum in the shape of wire of 0.55 mm. diameter)—titanium tetrachloride type catalyst is used, the reaction conditions and the rate of reaction, as well as the physical properties of the polymerization product, have been investigated under a constant ethylene pressure, and it has been formed that a constant reaction velocity is indicated by the following equation:

$$R(\text{mole/l. min.}) = 4.8 \times 10^2 \exp\{-12,500/RT\}[\text{Al}][\text{TiCl}_4]P^2$$

wherein:
[Al]: grams of Al wire,
[TiCl$_4$]: TiCl concentration mole/l. of n-heptane,
P: total pressure kg./cm.$^2$
t: time min.
R: gas constant
T: reaction temperature ° K.

When the catalyst amount increases, a molecular weight of the product also increases gradually. Although an increase of the mole ratio of aluminum to titanium tetrachloride generally causes a little increase of molecular weight of the product, the molecular weight arrives at a constant value of approximately 30,000 to 100,000. As the reaction temperature is raised increasingly, the molecular weight decreases gradually and at the temperature range of 90–180° C. and then, above this temperature range, decreases to form a partially liquid polymer.

Considering these results in comparison with an ethylene polymerization with the so-called "Ziegler catalyst" in which an oragnic metal compound is included as one ingredient, the molecular weight, if a Ziegler catalyst is used, markedly increases corresponding to a raise of the ratio of Al to TiCl$_4$ and a decrease of the catalyst amount. Therefore, it should be clearly understood that the polymerization process using the catalytic composition of the present invention is essentially different from the process using Ziegler catalyst.

By our kinetic investigations of the polymerization reaction in which the abovesaid catalyst is employed, it has been found that, when reaction temperature, charged amount of catalyst and pressure are constant, the apparent rate of the polymerization reaction is constant and then, after a certain period of time, it becomes another constant value. That is to say, the polymerization reaction rate is indicated by the equation $-dM/dt = k$ and the $k$ value during the first period of the reaction is different from that of the latter period of the reaction. The relativity of this constant to the pressure on the former or latter period of the reaction is respectively second or first order in relation to the partial pressure of ethylene. Thus, molecular weight of the product increases corresponding to the reaction time, and its increase is remarkable in the first period of the reaction.

It seems that the reaction mechanism of the process according to the present invention is quite different from that of the conventional processes. Considering that polymerization by the process of this invention occasionally tends to develop on a surface of the metal which is an ingredient of the catalyst and that sometimes the catalyst activity is proportional to acidity of the metal halide, it is suggested that the polymer production of the process of this invention is mainly carried out by such a heterogeneous reaction that the propagation of a polymer radical, that is, cation or cationic radical of polymer chain having the metal halide molecule of an initiator as an end group, proceeds on the surface of the metal which is able to attach to the end group when said metal is suitably selected. This suggestion is supported by the fact that, when the titanium tetrachloride is used for the ethylene polymerization as the metal halide, only the suitably selected metal ingredient causes a yield of the higher molecular polymer and a mere supply of metallic surface is never sufficient to produce a high polymer.

A metal halide which is the most effective as this type of catalyst is a metal halide of group IV to VIII of the periodic table, which has as many halogen atoms as possible in one molecule, or a mixture of metal halides of group IV to VIII. As metals, there may be used a metal of group II to IV of the periodic table and a mixture or an alloy of more than two of the above said metals. The metal halide having as many halogen atoms as possible in one molecule is such that halogen atoms are combined with the metal in the highest atomic valence. The highest atomic valence of various metals are as follows: Sn, 4; Fe, 3; Ti, 4; V, 4; Cr, 3; Mo, 5; Pb, 4; and Mn, 3.

A catalytic composition of this invention contains at least one metal halide of group IV to VIII of the periodic table in free state, these metal halides having as many halogen atoms as possible in one molecule.

As shown in the following experimental results relating to the polymerization reaction of ethylene, a yield of the solid product and the reaction rate drops in the order of $TiCl_4 > TiCl_3 > TiCl_2$, when each of the titanium halides having various atomic valences are respectively used with aluminum metal. The results show that the halides having a high atomic valence plays an important part in the polymerization process according to this invention.

| Catalyst (g.) | Reaction temperature (° C.) | Reaction pressure (atm.) | Yield of solid product (g.) | Yield ratio (percent) |
|---|---|---|---|---|
| Al 1.0, $TiCl_4$ 0.4 | 100 | 100 | 2.5 | 35 |
| Al 1.0, $TiCl_3$ 0.5 | 140 | 100 | 0.2 | 3 |
| Al 1.0, $TiCl_2$ 0.5 | 200 | 100 | 0 | 0 |

In the above, when the reaction temperature for titanium dichloride, as well as for titanium trichloride, is lower than the above described temperature, neither a solid polymer nor a liquid polymer can be obtained. When a solid polymer is not produced or is produced in very small quantity because a metal halide having an atomic valence lower than the highest one used, the addition of a metal halide having the highest atomic valence and belonging to group IV to VIII causes producing of solid polymer or increasing the yield and the molecular weight of the solid polymer remarkably. For example, comparative experimental results are set forth as follows:

| Catalyst (g.) | Viscosity average molecular weight | Yield of solid polymer (g.) |
|---|---|---|
| I. {Al 1.0, $TiCl_3$ 0.3 | 20,000 | 0.3 |
| {Al 1.0, $TiCl_3$ 0.3, $TiCl_4$ 0.34 | 40,000 | 2.3 |
| II. {Al 1.0, $TiCl_2$ 0.2 | Liquid product | 0 |
| {Al 1.0, $TiCl_2$ 0.2, $TiCl_4$ 0.17 | 35,000 | 4.0 |

In the process of this invention, metal elements of group II to IV of the periodic table, or their mixtures or alloys may be used. Among these metals of group II to IV, Mg, Al, Zn, Ti and Zr are preferable.

In the present invention, the metal elements alone, in a mixture or in an alloy are employed at least partially as agitating means of the polymerization apparatus, such as stirrer, blades or propellers of stirrer, nets or plates equipped onto stirrer, and others. When compared with the case where such metal elements are employed in an ordinary mode of use, for example, in a form of powder, granules, rings, and chips, present in the reaction medium, or as the inner wall surface of the apparatus, the present invention, in which the metal elements are employed as at least part of agitating means, have various advantages as mentioned below. Namely, the yield of polymerization product per unit amount of catalyst is increased and also the product after the reaction is in a slurry state which makes separation easy. This is due to the fact that no polymerization product is deposited on the surface of the metal, since there occurs a high relative velocity between the reaction mixture and the surface of the metal during the polymerization reaction. Furthermore, when the polymerization reaction is achieved as above, a reaction product having a high homogeneity is obtained. Moreover, the molecular weight of the polymer has a narrow distribution. Furthermore, control of the molecular weight is so remarkably easy that polymers having great varieties of molecular weight may be obtained by varying the conditions.

In general, when a metal outside of group II to IV is used, the polymerization reaction is not promoted. When a mixture of a metal of group II to IV and a metal outside of group II to IV is used, the result of the polymerization is worse than when a metal of group II to IV is used alone. For instance, when aluminum is used as the metal of group II to IV, and titanium tetrachloride is used as the metal halide, and moreover a metal such as nickel or chromium is mingled with the resulting catalyst mixture, the yield of the solid polymer considerably decreases as compared with the case in which only aluminum is used and, further, a formation of a grease-like polymer is caused.

The metal component of the catalyst of the present invention, if need be, may be treated with hydrogen to remove an oxide film, whereby the optimum reaction conditions to be chosen can be varied.

The metal component and metal halide component of the present catalyzer are selected according to the type of monomer starting material and molecular weight of the desired polymer. For instance, when ethylene is polymerized to produce solid polyethylene, the titanium halide comprising titanium tetrahalide alone or in mixture and a metal such as aluminum, magnesium, zinc or a mixture or alloy thereof are suitable. In the case of propylene, magnesium is combined with titanium tetrachloride, or aluminum or aluminum-titanium alloy is suitably combined with titanium tetrachloride comprising titanium trichloride. These combinations must be chosen in relation to the desired product in copolymerization processes too. Moreover, in relation to the type of reaction apparatus such as batch style, semi-batch style or tubular style, the type of metal component as well as its manner of use must be suitably selected. In these cases, the metal halide which is a component of the catalyst is used separately by dissolving or suspending the same in an inert solvent, while the metal which is another component of the catalyst is used at least as part of agitating means. Practical selections and uses of each component of the catalyst of this invention, as stated hereinabove, should be determined, not only based on the relation between the monomer and the desired polymer, that is, the pure chemical viewpoint relating to the polymerization reaction per se, but also on the engineering viewpoint e.g. supply, separation, purification, apparatus strength and the like. However, such modifications of practical applications do not deviate from the spirit of the present invention and are not to be construed as limiting the scope of this invention. As mentioned hereinabove, the features of the present invention reside in an efficient production of olefin polymer using the coexistence of a particular metal halide with a metal suitably selected therefor, and using said metal as agitating means.

The polymerization reaction using the catalyst of the present invention may be carried out at a pressure higher than atmospheric pressure and at a temperature above room temperature. Temperatures in a range of 20–200° C. and pressures in a range of 1–300 atm. are preferable. Of course, reaction conditions should be changed correspondingly to the properties of the monomer and the desired polymer.

Solvents are conveniently used not only to prevent the local over-heating which results from the generation of heat of the polymerization, but also to prevent the choking of the apparatus. For these purposes, common inert solvents can be used. Sometimes, the solvent is selected corresponding to the type of the monomer. Alphatic and aromatic hydrocarbons such as heptane, hexane, benzene, toluene, decaline, tetraline and the like, or their mixtures are conveniently used.

Example 1

Into a 100 cc. internal volume autoclave with an electromagnetic stirrer, 20 cc. of n-heptane were charged. As stirring blades, three aluminum plates having a thickness of 3 mm. were used. Then a mixture of titanium tetraiodide, a small amount of titanium diiodide, titanium triiodide and titanium was charged. Thereafter, while the stirrer was operated, ethylene was introduced at a pressure of 100 kg./cm.$^2$ at 130° C. and the polymerization was effected. After 3½ hours, 2.5 g. of a higher molecular polyethylene having a melting point of 135–145° C. and a molecular weight of 350,000 were produced.

Example 2

In Example 1, 8.0 l. of propylene was charged in the autoclave in place of ethylene. When the autoclave was heated at 45° C., a polymerization reaction proceeded rapidly. After 30 minutes, the pressure dropped from 10 kg./cm.$^2$ to the atmospheric pressure. About 8 g. of viscous greasy polymer was recovered.

Example 3

Into a 500 cc. internal volume autoclave with an electromagnetic stirrer, 100 cc. of toluene containing 2.5 wt. percent of titanium tetrachloride were charged. Five aluminum nets (4 mesh per square inch) were used on the electromagnetic stirrer. After the autoclave was heated to 100° C., ethylene was introduced by compression to a pressure of 30 kg./cm.$^2$. The ethylene was additionally supplied to keep the temperature constant, as the pressure rapidly dropped during stirring. After 3½ hours, 120 g. of a crude polyethylene were obtained. By treating with hot water, a white powder was recovered, the melting point being 122–124° C., and the molecular weight being 35,000. After the reaction, the aluminum nets were recovered and their weight was measured. They did not show any change in their weight, and their surfaces did not change as compared with the surfaces before using.

Example 4

In Example 3, a mixed gas of ethylene and propylene (70:30) was introduced into the autoclave up to pressure of 60 kg./cm.$^2$, in place of ethylene. Upon heating the autoclave at 65° C., the reaction proceed. After 2 hours, the pressure decreased to atmospheric pressure. The polymerizate was recovered and washed with hydrochloric acid-methanol. About 7 g. of an elastic polymer having melting point of 132° C. and critical viscosity (in tetralin at 130° C.) of 2.0 was obtained. The infrared spectrum of the resulting polymer was different from those of polyethylene and polypropylene.

Example 5

A stirrer having two aluminum nets (10 mesh per square inch) was used in to a 100 cc. internal volume electromagnetic stirring type autoclave. Into the autoclave 20 cc. of n-heptane solution containing 7.0 mmoles of a titanium tetrachloride-titanium dichloride equimolar mixture were charged and then ethylene was introduced at a pressure of 10 kg./cm.$^2$ at 130° C. Over a period of two hours, the ethylene was additionally supplied. When the product was purified in the same manner as above after reaction, 20 g. of a high molecular polyethylene having a molecular weight of 280,000 were obtained. When a stainless-steel net was used in place of the aluminum net in this example, the reaction proceeded at a temperature above 180° C. and only an oily polymer was produced. Thus, it was affirmed that, unless a suitable metal is present even if titanium tetrachloride and titanium dichloride coexist, a higher molecular polymer is not produced.

Example 6

Using n-butene in place of ethylene in Example 5, the same operation as in Example 5 was repeated, except that the reaction temperature is 60° C. and the reaction pressure of 5 kg./cm.$^2$. About 5.8 g. of viscous greasy polymer were obtained.

Example 7

Using isobutene, in place of n-butene in Example 6, the same operation as in Example 6 was repeated. About 7.8 g. of viscous greasy polymer was obtained.

Example 8

In an autoclave as in Example 1, a propeller made from aluminum containing 2 wt. percent of titanium was employed as an electromagnetic stirrer. 20 cc. of benzene containing 3.5 mmoles of titanium tetrachloride was charged into the above autoclave. Ethylene gas containing 10% of propylene was introduced by compression to 50 atm. at a reaction temperature of 100° C. to effect the polymerization. After 40 minutes, 2.0 g. of a solid polymer were obtained. This solid polymer had an extremely higher elasticity than a polymer of ethylene alone, and had a melting point of 125–140° C. Also when a material containing 1 wt. percent of zirconium in place of 2 wt. percent of titanium in the aluminum-made propeller was employed, 1.7 g. of a solid polymer were obtained.

Example 9

A propeller type stirrer made from a commercial alumium alloy comprising 4.0% copper, 0.5% manganese, 0.5% magnesium and 95% aluminum was used in to a 5 l. internal volume autoclave of aluminum lining. Into the autoclave, 1.5 l. of xylene solution containing 25 g. of titanium tetrachloride was charged. Ethylene was introduced to a pressure of 100 kg./cm.$^2$ at 100° C. The reaction was carried out at the above temperature and the stirring at 200 r.p.m. was effected. While ethylene was additionally supplied, the reaction proceeded over two hours. Thereafter, the content was recovered from the autoclave. By treating with hot water, 120 g. of white polyethylene powder having a melting point of 130–140° C. were obtained.

Example 10

Using 2 g. of magnesium-aluminum alloy plate (3:2 by weight) in place of aluminum in Example 1, the same operation as in Example 1 was repeated. About 7 g. of solid polymer was obtained. Their molecular weight was 270,000.

Example 11

In Example 5, a solution of vanadium tetrachloride in n-heptane in place of titanium tetrachloride-n-heptane solution was used. The same operation as in Example 5 gave about 7 g. of solid polymer having molecular weight of 100,000.

Example 12

This example is set forth on account of showing the advantages of the process of the present invention, in which the effectiveness of the metal component of the catalyst when used as stirring blades is compared with that when used as a plate merely present in the reaction system.

In an 100 ml.-volume autoclave having a rotating stirrer, 30 ml. of TiCl$_4$ solution in n-heptane (0.10 mol/liter) was placed. Ethylene was charged and allowed to polymerize at the pressure of 50 kg./cm.$^2$ and at the temperature of 150° C. for 300 minutes. (The stirring was 100 r.p.m.)

In one experiment, the stirring blades were constituted by aluminum plates, the surface area of which was 7.2 cm.$^2$ (Experiment 1). In another experiment, aluminum plate of 5.4 cm.$^2$ surface area was placed in the autoclave, but the stirrer blades were of stainless steel. (Experiment 2.)

In still another experiment, aluminum plate of 9.0 cm.$^2$ surface area was placed in the autoclave, but the stirrer blades were of stainless steel. (Experiment 3.)

The yields, the appearances and the physical properties of the resulting polymers are as follows.

| Experiment No. | Yield, g. | Appearance | Intrinsic viscosity | Molecular weight |
| --- | --- | --- | --- | --- |
| 1 | 5.30 | Powder | 2.8 | 2.7×10$^4$ |
| 2 | 1.05 | Oil and flake | 0.4 | [1] 1.2×10$^4$ |
| 3 | 2.10 | do | 0.6 | [1] 1.3×10$^4$ |

[1] Molecular weight was measured as to the non-oily part of the polymer.

Example 13

A stirrer having two plates (made from an aluminum alloy comprising 95% aluminun and 5% strontium) which have the size of 30 cm.$^2$ was used into a 120 cc. internal volume electromagnetic stirring type autoclave. Into the autoclave, 20 cc. of n-heptane and 1 g. of MoCl$_3$ and then ethylene were charged at a pressure of 20 kg./cm.$^2$ at 180° C. After 1 hour, ethylene was additionally charged. 4 g. of soft wax polymer was obtained which has 2.5 CH$_3$ groups per 100 carbon atoms.

Example 14

Using equimolecular mixture of ferric chloride, manganese trifluoride and titanium trichloride in place of titanium iodide in Example 2, the same operation as in Example 2 was repeated. About 7 g. of a stiff greasy polymer was obtained. The molecular weight of the polymer was about 7,500.

Example 15

Using 2 g. of equimolecular mixture of zirconium tetrachloride and cobalt dichloride in place of titanium tetrachloride and titanium dichloride, and using a mixture gas of ethylene and isobutylene (70:30) in place of ethylene in Example 5, the same operation as in Example 5 is repeated. 15 g. of an elastic solid polymer was obtained.

Example 16

Using a stirrer having 5 plates which were made of galvanized iron in place of aluminum nets in Example 3, the same operation as in Example 3 was repeated. About 70 g. of polyethylene whose molecular weight was 25,000 was obtained.

What we claim is:

1. A process of preparing olefin polymers in reaction apparatus, said process comprising bringing at least one olefin selected from the class consisting of ethylene, propylene, n-butylene and isobutylene at a temperature below 200° C. at a pressure ranging from 1 to 300 atmospheres into contact with an inert solvent which contains at least one metal halide of a IV–VIII series metal, in the presence of at least one metal of the II–IV series, said metal being in a free state and constituting at least part of an element of said apparatus, which is employed to agitate the solvent.

2. A process according to the claim 1, in which said metal halide is selected from the group consisting of titanium tetrachloride, titanium tetrabromide, titanium tetraiodide, vanadium pentachloride, molybdenum trichloride, iron trichloride, manganese trifluoride and zirconium tetrachloride.

3. A process according to the claim 1, in which said metal is selected from the group consisting of aluminum, and alloys containing the same.

4. A process according to the claim 1, in which said metal is galvanized iron.

5. A process according to the claim 1, in which said element is a stirrer.

6. A process according to the claim 1, in which said element includes a plurality of stirring blades.

7. A process according to the claim 1, in which said element is in the form of a net intstalled on a stirrer.

References Cited by the Examiner
UNITED STATES PATENTS 2,868,771   1/59   Ray     260—94.9
2,914,517  11/59   Schmerling     260—94.9

JOSEPH L. SCHOFER, *Primary Examiner.*